(No Model.)

S. R. BAILEY.
CARRIAGE SPRING.

No. 596,313. Patented Dec. 28, 1897.

Witnesses.
Lauritz N. Möller
Henry R. Page

Inventor
Samuel R. Bailey
by Alban Andrew
his atty.

UNITED STATES PATENT OFFICE.

SAMUEL R. BAILEY, OF AMESBURY, MASSACHUSETTS.

CARRIAGE-SPRING.

SPECIFICATION forming part of Letters Patent No. 596,313, dated December 28, 1897.

Application filed August 5, 1897. Serial No. 647,177. (No model.)

*To all whom it may concern:*

Be it known that I, SAMUEL R. BAILEY, a citizen of the United States, and a resident of Amesbury, in the county of Essex and State of Massachusetts, have invented new and useful Improvements in Carriage-Springs, of which the following, taken in connection with the accompanying drawings, is a specification.

This invention relates to improvements in carriage-springs for vehicles; and it relates to improved means for connecting the ends of the leaf or elliptic springs, as will hereinafter be more fully shown and described, reference being had to the accompanying drawings, wherein—

Figure 1:
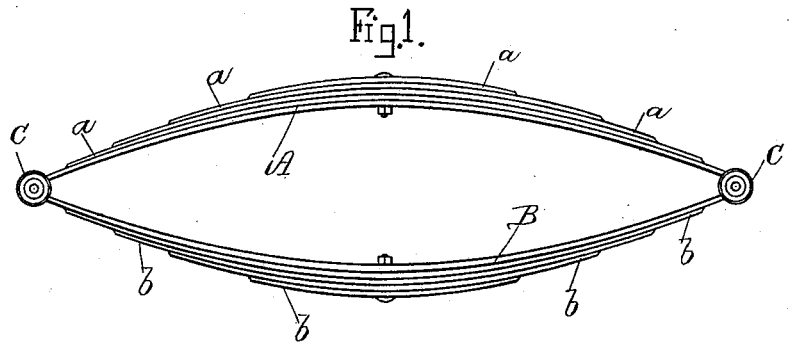
Figures 2, 3:
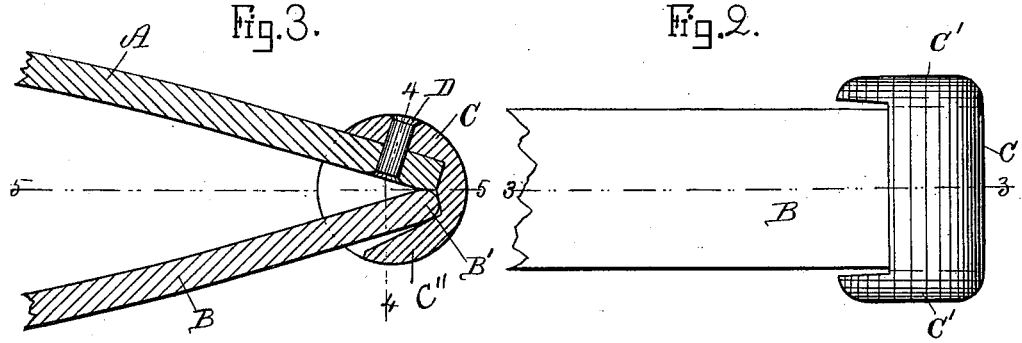
Figure 4:
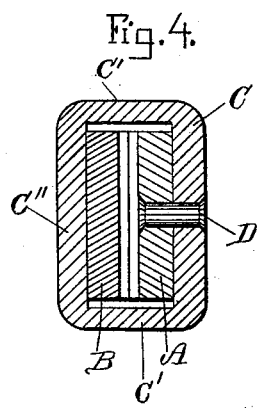
Figure 5:
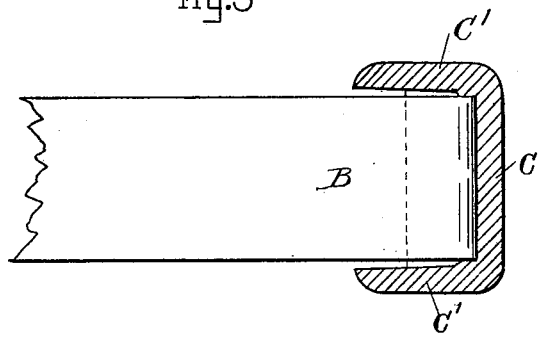

Figure 1 represents a side elevation of a carriage-spring, showing its ends connected by my improved device. Fig. 2 represents an enlarged bottom view of one of the ends of the spring and its connections to the upper spring. Fig. 3 represents a longitudinal section on the line 3 3 shown in Fig. 2. Fig. 4 represents a cross-section on the line 4 4 shown in Fig. 3, and Fig. 5 represents a horizontal section on the line 5 5 shown in Fig. 3.

Similar letters refer to similar parts wherever they occur on the different parts of the drawings.

In Fig. 1, A and B represent, respectively, the upper and lower leaves of an elliptic or leaf vehicle-spring, to which are respectively attached the additional leaf-springs $a\,a\,a$ and $b\,b\,b$, as is usual in this kind of carriage-springs. Springs of this kind are usually pivoted together at their outer ends upon pivot-bolts passing through ears or eyes made on the ends of the springs, which is an objectionable arrangement on account of its being costly to make and liable to rattling, as well as being liable to breakage by the constant wear and tear on the pivot-bolts and the perforated eyes or ears on the spring ends. To obviate such objection, I secure to each end of the upper spring A a metal socket C, preferably secured to the end of the upper spring A by means of a rivet D, as shown in Figs. 3 and 4.

The ends of the springs A B are arranged to bear one against the other, as shown in Fig. 3, and in practice I make the end of the free spring B convex where it bears against the interior of the socket C, as shown at B' in Fig. 3, so as to allow said spring to yield relatively to the upper spring without much frictional resistance.

The socket C is provided with circular closed end pieces C' C', made integral with said socket, which serve as abutments to prevent a lateral motion of the free spring B relative to the fixed spring A, as shown.

The lower portion of the socket C is provided with an inwardly-projecting lip C", which serves the purpose of holding the ends of the upper and lower springs together and preventing their getting apart by the jolting of the carriage or otherwise.

The invention is very simple in construction, easy of putting together, and serves as a strong and durable means for yieldingly connecting the ends of carriage-springs in a manner as hereinabove described.

What I wish to secure by Letters Patent and claim is—

The herein-described carriage-spring consisting of two members, to the ends of one of which are secured socket-pieces having closed ends, and the ends of the other member of which are freely disposed in said socket-pieces and confined against lateral displacement by the closed ends thereof, substantially as described.

In testimony whereof I have signed my name to this specification, in the presence of two subscribing witnesses, on this 12th day of July, A. D. 1897.

SAMUEL R. BAILEY.

Witnesses:
ALBAN ANDRÉN,
LAURITZ N. MÖLLER.